(12) United States Patent
Takeuchi et al.

(10) Patent No.: US 12,388,518 B2
(45) Date of Patent: Aug. 12, 2025

(54) PASSIVE RELAY DEVICE AND PASSIVE RELAY METHOD

(71) Applicant: NIPPON TELEGRAPH AND TELEPHONE CORPORATION, Tokyo (JP)

(72) Inventors: Yosuke Takeuchi, Tokyo (JP); Hisatoshi Kasahara, Tokyo (JP); Yosuke Okamura, Tokyo (JP); Junichiro Tamamatsu, Tokyo (JP); Tomoki Murakami, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 400 days.

(21) Appl. No.: 17/798,060

(22) PCT Filed: Feb. 6, 2020

(86) PCT No.: PCT/JP2020/004630
§ 371 (c)(1),
(2) Date: Aug. 5, 2022

(87) PCT Pub. No.: WO2021/157028
PCT Pub. Date: Aug. 12, 2021

(65) Prior Publication Data
US 2023/0114389 A1    Apr. 13, 2023

(51) Int. Cl.
*H04B 7/145*    (2006.01)

(52) U.S. Cl.
CPC .................................. *H04B 7/145* (2013.01)

(58) Field of Classification Search
CPC ................................ H04B 7/145; Y02D 30/70
See application file for complete search history.

(56) References Cited

U.S. PATENT DOCUMENTS

2007/0026796 A1* 2/2007 Mizushina ............. H04B 13/02
455/40
2021/0105546 A1* 4/2021 Rodriguez, Jr. ......... H04Q 9/00

FOREIGN PATENT DOCUMENTS

JP    2002368665 A    12/2002
JP    2004072154 A    3/2004

OTHER PUBLICATIONS

Fujino et al. (2018) "Relay radio technology that reliably accommodates IoT terminals in places where radio waves are difficult to reach" NTT Technical Journal vol. 30, No. 7, pp. 15-18.

* cited by examiner

*Primary Examiner* — Ankur Jain (57) ABSTRACT

A passive relay device (100) relays radio communication between the inside of a radio wave shielding structure (200) and the outside of the radio wave shielding the structure (200), and the device includes an internal antenna (10) which connects with the inside, an external antenna (20) which connects with the outside, and a connection part (30) which connects the internal antenna (10) and the external antenna (20).

16 Claims, 6 Drawing Sheets

PASSIVE RELAY DEVICE AND PASSIVE RELAY METHOD

CROSS-REFERENCE TO RELATED APPLICATIONS

This application is a U.S. National Stage Application filed under 35 U.S.C. § 371 claiming priority to International Patent Application No. PCT/JP2020/004630, filed on 6 Feb. 2020, the disclosure of which is hereby incorporated herein by reference in its entirety.

TECHNICAL FIELD

The present invention relates to a passive relay device and a passive relay method.

BACKGROUND ART

Conduits, instruments, and other items are provided in underground structures (in radio wave shielded spaces) such as reinforced concrete manholes buried underground, but since it is difficult to inspect them from above the ground, workers must enter these underground structures periodically to inspect the equipment provided inside or the underground structures themselves. However, it requires complicated preparation for entering because toxic gas and stagnant water may exist inside an underground structure, and if the underground structure exists in a roadway, permission to use the roadway may be necessary. Therefore, in order to eliminate the necessity to enter into the underground structure or to reduce the frequency of entering, there have been studies about a method for providing measurement devices such as strain sensors, water level sensors, and cameras inside the underground structure and transmitting data obtained from these devices to the outside of the underground structure (see, for example, NPL 1).

CITATION LIST

Non Patent Literature

[NPL 1] Fujino, et al, "Relay Wireless Technology for Ensuring Network Accommodation of IoT Terminals in Locations where Radio Waves are Hard to Reach," NTT GIJUTU Journal, July 2018, pp. 15-18 (2018)

SUMMARY OF THE INVENTION

Technical Problem

However, when a measurement device is provided in an underground structure and data is transmitted to the outside of the underground structure, data transmission using high frequency radio waves for example by Wi-Fi® is limited to very short distances because high frequency radio waves cannot easily penetrate the soil around the underground structure or the materials of the structure. When a relay device is provided to amplify the signal strength in order to transmit high-frequency radio waves over long distances, each of the measurement device and the relay device requires electric power, and multiple power supplies must be provided or a power distribution installation from a single large-capacity power supply to these devices must be provided, which complicates the structure.

With the foregoing in view, it is an object of the present invention to provide a passive relay device and a passive relay method which allow long distance radio communication to be carried out between a radio wave shielded space and the outside in a simple configuration.

Means for Solving the Problem

A passive relay device according to one embodiment of the present invention relays wireless communication between the inside of a radio wave shielding structure and the outside of the radio wave shielding structure, and the device includes an internal antenna which connects with the inside, an external antenna which connects with the outside, and a connection part which connects the internal antenna and the external antenna.

A passive relay method according to one embodiment of the present invention is a passive relay method for a passive relay device which relays wireless communication between an internal device provided inside a radio wave shielding structure and an external device provided outside the radio wave shielding structure, the passive relay device includes an internal antenna which transmits/receives radio waves to/from the internal device, an external antenna which transmits/receives the radio waves to/from the external device, and a connection part which connects the internal antenna and the external antenna, and the method includes the steps of receiving data from the internal device and transmitting the data to the external antenna through the connection part by the internal antenna and receiving the data from the internal antenna through the connection part and transmitting the data to the external device by the external antenna.

Effects of the Invention

According to the present invention, it is possible to provide a passive relay device and a passive relay method which allow long-distance wireless communication to be carried out between a radio wave shielded space and the outside in a simple configuration.

DESCRIPTION OF EMBODIMENTS

One embodiment of the present invention will be described in detail in conjunction with the drawings.

<Passive Relay Device>

Figure 1:
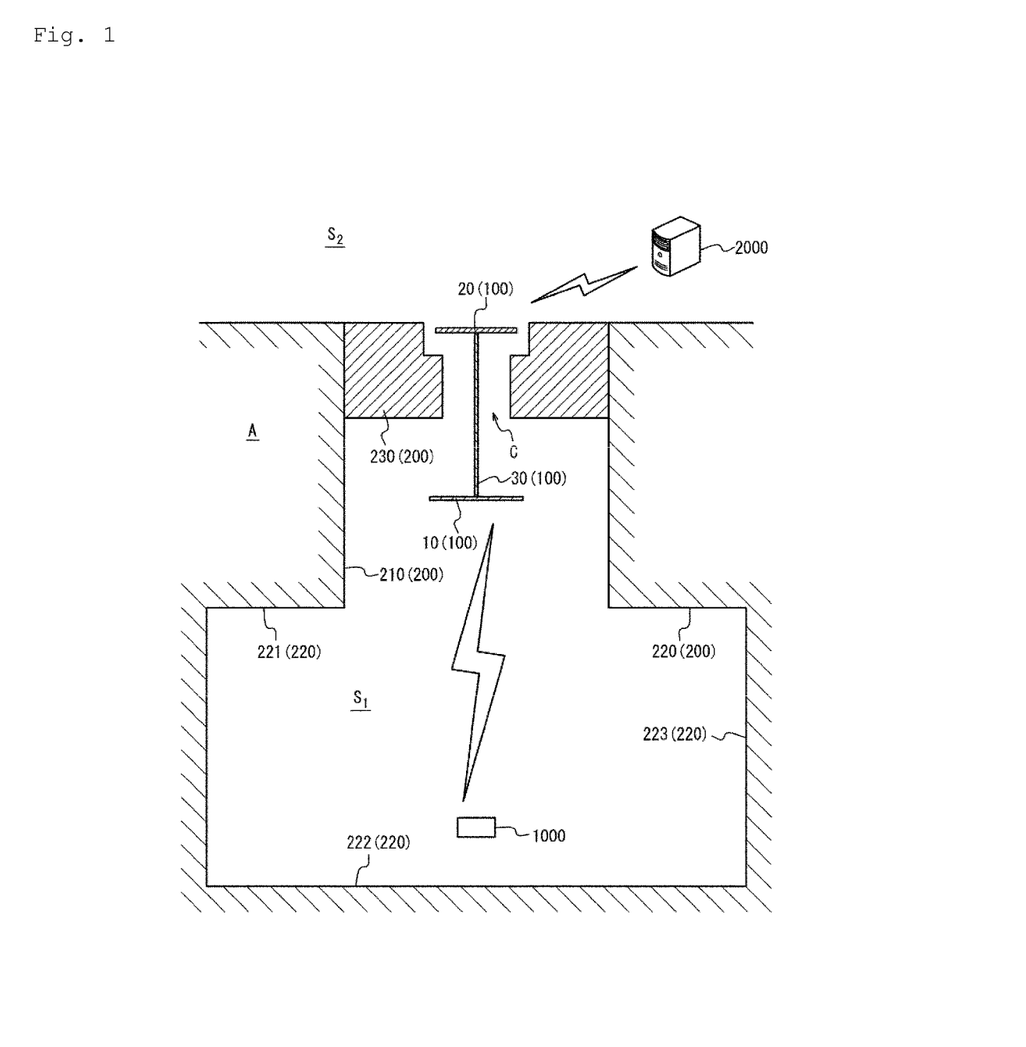
FIG. 1 is a view of an exemplary structure of a passive relay device according to one embodiment of the present invention.
Figure 2:
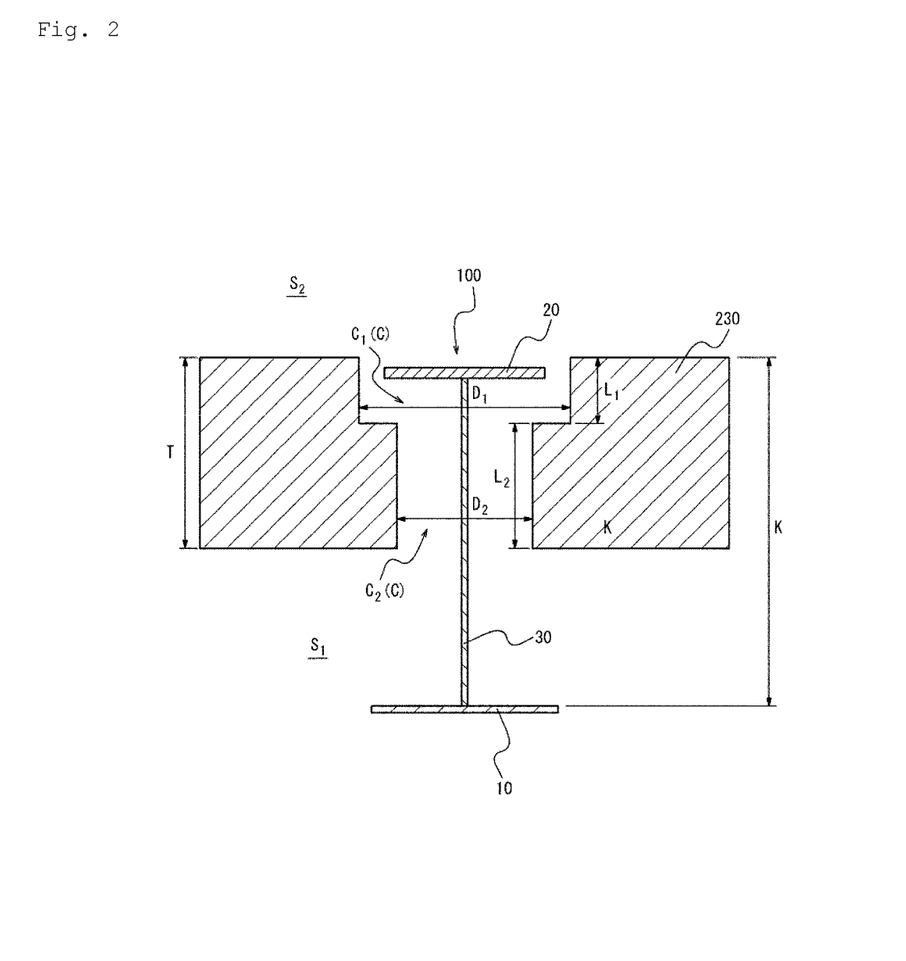
FIG. 2 is a view of an exemplary structure of a manhole iron cover having a built-in passive relay device according to one embodiment of the present invention.
Figure 3:
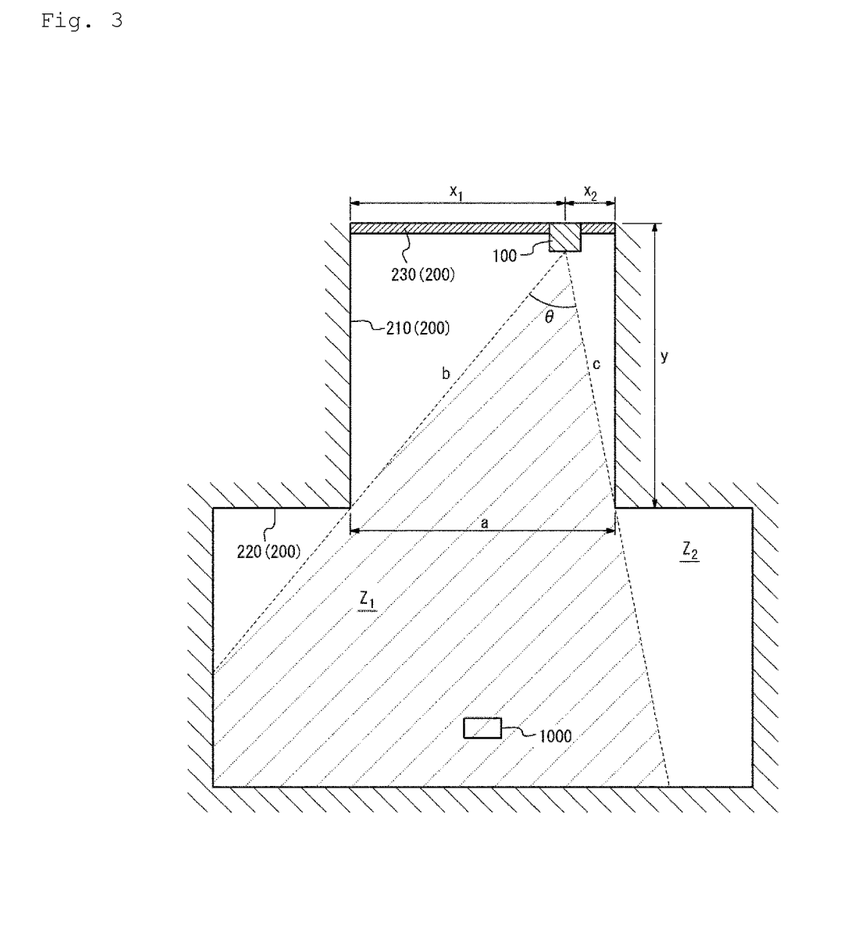
FIG. 3 is a view for illustrating the directionality of an internal antenna according to one embodiment of the present invention.

With reference to FIGS. 1 to 3, an exemplary structure of a passive relay device 100 according to one embodiment of the present invention will be described.

The passive relay device 100 includes an internal antenna 10, an external antenna 20, and a connection part 30. The passive relay device 100 does not need a power supply system and relays wireless communication between an internal device 1000 provided inside a radio wave shielding structure and an external device 2000 provided outside the radio wave shielding structure.

The internal device 1000 may, for example, be a strain sensor, a water level sensor, or a camera for performing measurement at a prescribed location inside the radio wave shielding structure. The external device 2000 may, for example, be a server for managing various kinds of information in the radio wave shielding structure. The internal device 1000 and the external device 2000 are connected over a wide area network such as LTE (Long Term Evolution) and LoRaWAN (Long Range Wide Area Network) through the passive relay device 100.

The radio wave shielding structure is made of a material which shields radio waves. Examples of the material which shields radio waves include metal, concrete, and resin concrete. The inside of the radio wave shielding structure is a radio wave shielded space where radio waves are shielded. The outside of the radio wave shielding structure is a radio wave unshielded space where radio waves are not shielded. Herein, the term "radio wave shielded space" refers to a space where radio waves are completely or substantially shielded while the term "radio wave unshielded space" refers to a space where radio waves are completely unshielded or substantially unshielded.

As shown in FIGS. 1 and 2, the radio wave shielding structure may, for example, be a manhole 200 buried in an underground location A. The inside $S_1$ of the manhole 200 is a radio wave shielded space. The outside $S_2$ of the manhole 200 is a radio wave unshielded space.

The manhole 200 includes a neck part 210, a case body 220, and an iron cover 230. The neck part 210 and the case body 220 may, for example, be of reinforced concrete. The neck part 210 has a substantially cylindrical shape and has a radio wave shielded space inside. The case body 220 has a substantially rectangular parallelepiped shape and has a radio wave shielded space inside. The iron cover 230 has a substantially cylindrical shape and a through hole C is provided at the entrance/exit of the manhole 200.

As shown in FIG. 2, the iron cover 230 is provided with first and second through holes $C_1$ and $C_2$ which communicate the inside $S_1$ of the manhole 200 and the outside $S_2$ of the manhole 200. The worker passes the connection part 30 through the first and second through holes $C_1$ and $C_2$ and connects the connection part 30 and the external antenna 20 in the vicinity of the first through hole $C_1$ for example through a connector. The worker further connects the connection part 30 and the internal antenna 10 in the vicinity of the second through hole $C_2$, so that the passive relay device 100 is incorporated into the iron cover 230. The passive relay device 100 is incorporated in the iron cover 230, so that the passive relay device 100 can transmit radio waves received from the internal device 1000 at the inside $S_1$ of the manhole 200 to the external device 2000 at the outside $S_2$ of the manhole 200. In this way, long distance radio communication is allowed between the inside $S_1$ of the manhole 200 and the outside $S_2$ of the manhole 200.

The length K of the connection part 30 is preferably at least equal to the thickness T of the iron cover 230. For example, when the thickness T of the iron cover 230 is 46 mm, the length K of the connection part 30 is preferably at least 46 mm.

The through hole C needs only to have a size large enough to allow the passive relay device 100 to be incorporated in the iron cover 230. Preferably, when for example the internal antenna 10 has a width of 50 mm, the external antenna 20 has a width of 40 mm, and the connection part 30 has a length of 120 mm in the passive relay device 100, the diameter $D_1$ of the first through hole $C_1$ is about 55 mm, the length $L_1$ of the first through hole $C_1$ is about 20 mm, the diameter $D_2$ of the second through hole $C_2$ is about 30 mm, and the length $L_2$ of the second through hole $C_2$ is about 30 mm.

The internal antenna 10 connects with the inside $S_1$ of the manhole 200. More specifically, the internal antenna 10 is a transmission/reception antenna to transmit/receive radio waves to/from the internal device 1000. The internal antenna 10 is provided in the vicinity of one end side of the through hole C at the iron cover 230. The internal antenna 10 is preferably a directional antenna. An example of the directional antenna is a horn antenna. When the internal antenna 10 is a directional antenna, the antenna preferably has a directionality with respect to a radio wave reception angle calculated on the basis of the shape of the radio wave shielding structure.

Now, with reference to FIG. 3, the directionality of the internal antenna 10 will be briefly described. The directionality of an antenna refers to the property that the reception or transmission strength of a radio wave depends on the direction in which the radio wave is received or transmitted. The directionality of the internal antenna 10 may, for example, be adjusted by setting, as appropriate, the radio wave reception angle at the internal antenna 10. The radio wave reception angle at the internal antenna 10 is calculated on the basis of the shape of the radio wave shielding structure. When the radio wave shielding structure is for example the manhole 200, the neck part 210 of the manhole 200 as an introduction inlet into the radio wave shielded space limits the radio wave reception angle at the internal antenna 10. Therefore, the radio wave reception angle θ at the internal antenna 10 can be represented by the following expression.

[Math. 1]

$$\theta = \cos^{-1}\frac{b^2 + c^2 - a^2}{2bc} \qquad (1)$$
$$a = x_1 + x_2, b = \sqrt{x_1^2 + y^2}, c = \sqrt{x_2^2 + y^2}$$

In the expression, a is the diameter of the neck part 210, y is the length of the neck part 210, $x_1$ is the distance between the position of the passive relay device 100 and one end of a prescribed diameter of the iron cover 230, and $x_2$ is the distance between the position of the passive relay device 100 and the other end of the prescribed diameter of the iron cover 230.

The radio wave reception sensitivity at the internal antenna 10 increases in a region $Z_1$ where the radio wave reception angle at the internal antenna 10 satisfies the reception angle θ according to the above expression and decreases in a region $Z_2$ where the radio wave reception angle at the internal antenna 10 does not satisfy the reception angle θ according to the above expression. Therefore, the directionality of the internal antenna 10 of the passive relay device 100 incorporated in the iron cover 230 can be adjusted by setting the reception angle θ according to the above expression as appropriate.

Since the internal antenna 10 is a directional antenna, radio wave interference at the inside $S_1$ of the manhole 200 is reduced, the passive relay device 100 can receive radio waves transmitted by the internal device 1000 at the inside $S_1$ of the manhole 200 with high efficiency. In this way, the passive relay device 100 can transmit radio waves received from the internal device 1000 at the inside $S_1$ of the manhole 200 to the external device 2000 at the outside $S_2$ of the manhole 200 with high efficiency. Therefore, radio wave attenuation can be reduced in wireless communication between the internal device 1000 provided at the inside $S_1$ of the manhole 200 and the external device 2000 provided at the outside $S_2$ of the manhole 200. As a result, the passive relay device 100 which allows highly efficient long distance wireless communication to be carried out can be implemented.

Note that when the internal antenna 10 is not a directional antenna, the internal device 1000 may be provided with a directional antenna, so that the same effects can be provided. More specifically, as the internal device 1000 is provided with a directional antenna which transmits radio waves in a direction in which the internal antenna 10 is present, the passive relay device 100 can receive radio waves transmitted by the internal device 1000 with high efficiency.

The external antenna 20 connects with the outside $S_2$ of the manhole 200. More specifically, the external antenna 20 is a transmission reception/antenna which transmits/receives radio waves to/from the external device 2000. The external antenna 20 is provided in the vicinity of the other end side of the through hole C at the iron cover 230. The external antenna 20 is preferably a non-directional antenna with a simple structure. Examples of the non-directional antenna include a dipole antenna, a monopole antenna, an L-shaped antenna, and an inverted F-shaped antenna.

The external antenna 20 may be a directional antenna, but when the external antenna 20 is a directional antenna, the radio wave transmission/reception directions are limited. Therefore, in order to increase the performance of the antenna of the passive relay device 100 in a particular direction, it is useful to use a directional antenna for the external antenna 20.

The connection part 30 connects the internal antenna 10 and the external antenna 20. The connection part 30 may be a coaxial cable or a waveguide. The connection part 30 may include connectors at opposed ends thereof. The connection part 30 is for example connected with the internal antenna 10 through the connector at one end. The connection part 30 is for example connected with the external antenna 20 through the connector at the other end. The connection part 30 is preferably adapted to operate in a radio wave frequency band used for wireless communication between the internal device 1000 provided at the inside $S_1$ of the manhole 200 and the external device 2000 provided at the outside $S_2$ of the manhole 200.

The connection part 30 is provided in the through hole C at the iron cover 230. The length of the connection part 30 is preferably at least equal to the thickness of the iron cover 230 (see FIG. 2). As the length of the connection part 30 is at least equal to the thickness of the iron cover 230, the passive relay device 100 can efficiently relay radio waves between the inside $S_1$ of the manhole 200 and the outside $S_2$ of the manhole 200.

The element which connects the internal antenna 10 and the external antenna 20 is not limited to a coaxial cable or a waveguide.

The passive relay device 100 according to the embodiment has the internal antenna 10 which connects with the inside $S_1$ of the manhole 200, an external antenna 20 that connects with the outside $S_2$ of the manhole 200 and the connection part 30 which connects the internal antenna 10 and the external antenna 20. In this way, the passive relay device 100 can have a simpler structure because a power supply system is not necessary. When the passive relay device 100 according to the embodiment is used for wireless communication between the internal device 1000 provided inside the radio wave shielding structure and the external device 2000 provided outside the radio wave shielding structure, radio wave attenuation can be reduced, so that highly efficient long-distance wireless communication is allowed.

<Passive Relay Method>

Figure 4:
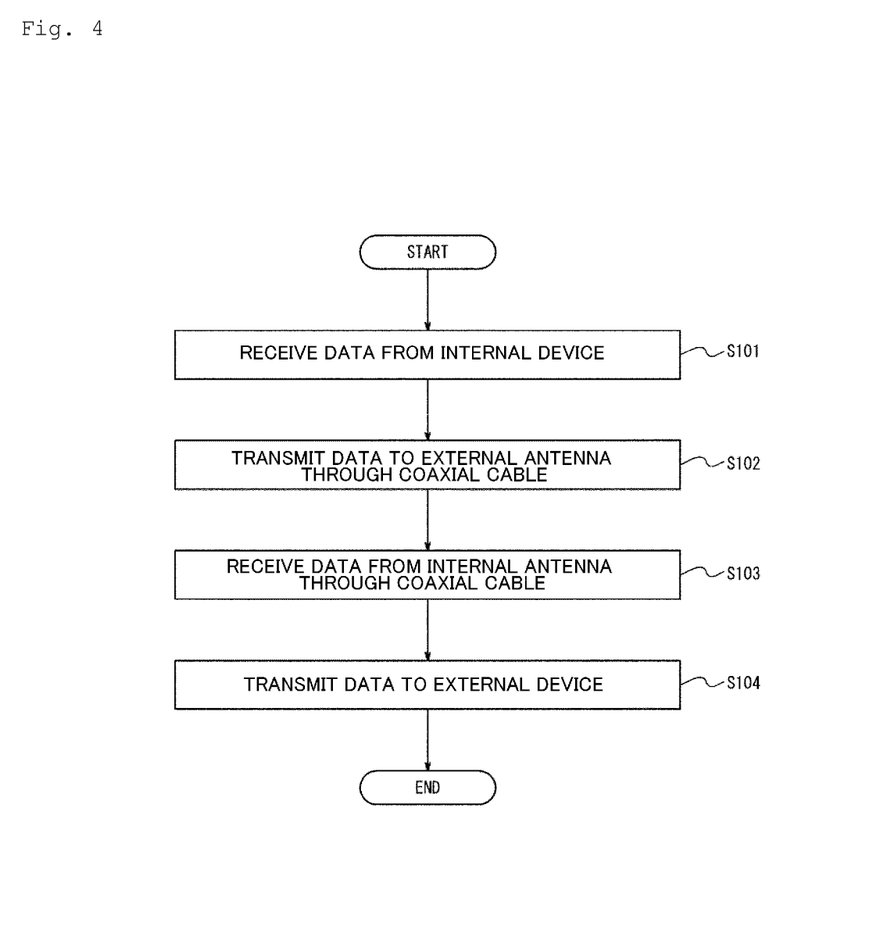
FIG. 4 is a flowchart for illustrating an exemplary passive relay method according to one embodiment of the present invention.

Now, with reference to FIG. 4, a passive relay method according to one embodiment of the present invention will be described.

In step S101, the internal antenna 10 receives data from the internal device 1000. The data is data transmitted and received between the internal device 1000 and the external device 2000 such as strain data related to the strain of the inside $S_1$ of the manhole 200, water level data related to the water level of the inside $S_1$ of the manhole 200, and image data related to an image of the inside $S_1$ of the manhole 200.

In step S102, the internal antenna 10 transmits the data to the external antenna 20 through the connection part 30.

In step S103, the external antenna 20 receives the data from the internal antenna 10 through the connection part 30.

In step S104, the external antenna 20 transmits the data to the external device 2000.

The passive relay method described above is carried out using the passive relay device 100 according to the embodiment, so that radio wave attenuation can be reduced in wireless communication between the internal device 1000 provided inside the radio wave shielding structure and the external device 2000 provided outside the radio wave shielding structure. As a result, the external device 2000 can reliably and efficiently collect various kinds of data from the internal device 1000 if the distance between the internal device 1000 and the external device 2000 is large. In this way, for example the causes of failures in underground structures can be analyzed and aging underground infrastructures such as water pipes can be monitored with high accuracy and high efficiency.

<Comparison of Signal Reception Strength>

Figure 5:
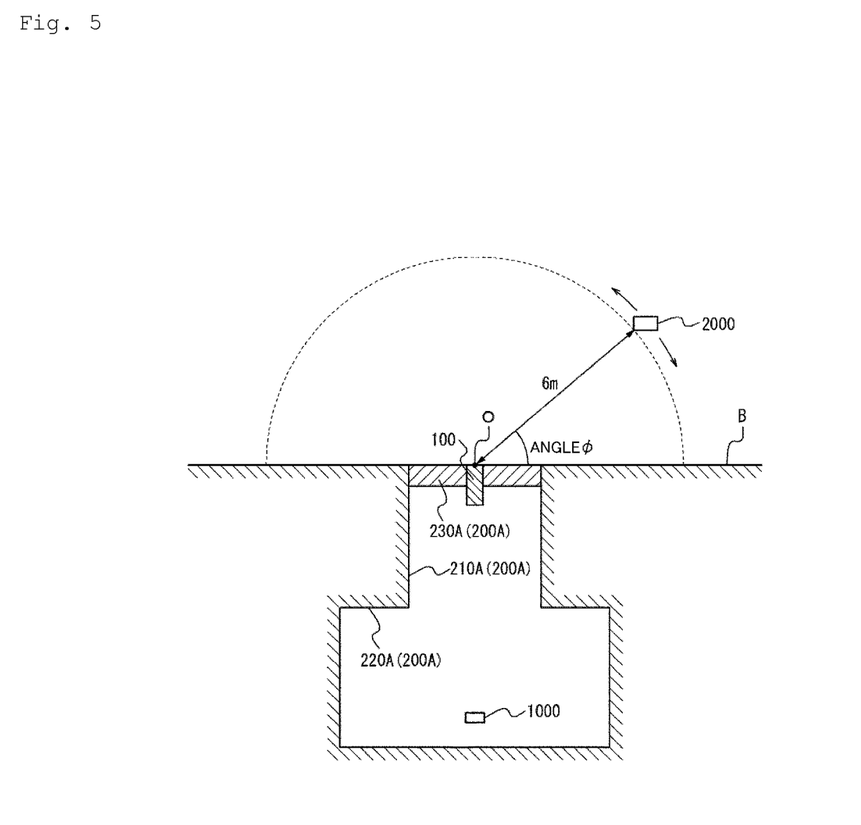
FIG. 5 is a view of an exemplary measuring system for measuring signal reception strength according to an inventive example and a comparative example.

As shown in FIG. 5, the signal reception strengths received by the external device 2000 was measured using a simulated manhole 200A.

The frequency of the radio wave was set to 2.45 GHz. The neck part 210A and the case body 220A in the simulated manhole 200A were shielded to prevent radio wave leakage. The distance between the center O of the simulated manhole 200A and the external device 2000 was set to 6 m. The angle φ of the straight line connecting the center O of the simulated manhole 200A and the external device 2000 with respect to the ground B was varied in the range of $0° \leq$ angle $\phi \leq 180°$ (see the arrow in FIG. 5).

As Comparative Example 1, the iron cover 230A was removed from the simulated manhole 200A, and the signal reception strength was measured without using the passive relay device 100.

As Comparative Example 2, the iron cover 230A was fitted to the simulated manhole 200A, and the signal reception strength was measured without using the passive relay device 100.

As Inventive Example 1, an iron cover 230A was fitted to the simulated manhole 200A, and the signal reception strength was measured using the passive relay device 100. The passive relay device 100 was incorporated into the iron cover 230A so that the passive relay device 100 was placed near the center O of the simulated manhole 200A. In the passive relay device 100 used in Inventive Example 1, the width of the internal antenna 10 was 50 mm, the width of the external antenna 20 was 40 mm, and the length of the connection part 30 was 120 mm.

Figure 6:
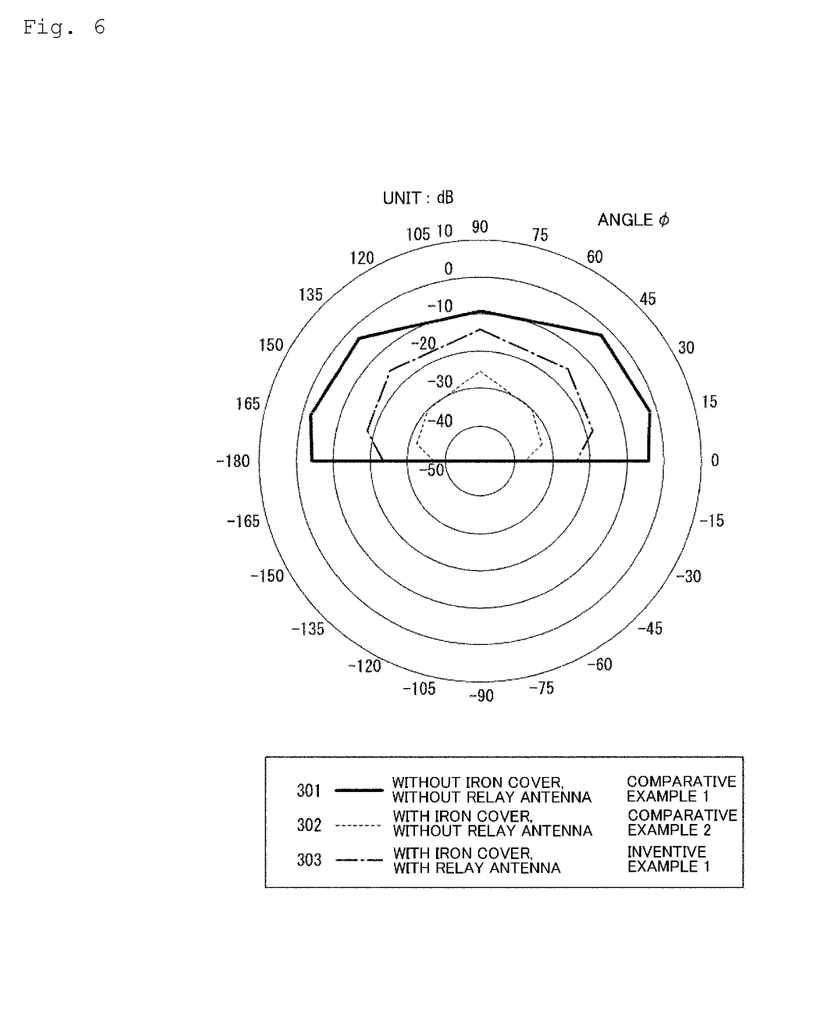
FIG. 6 illustrates an example of results of measuring signal reception strength according to the inventive example and the comparative example.

FIG. 6 shows an example of the measurement results of the reception strength of signals received by the external device 2000.

The graph 301 represents an example of the signal reception strength in Comparative Example 1. The graph 302 represents an example of the signal reception strength in Comparative Example 2. The graph 303 represents an example of the signal reception strength in Inventive Example 1.

As can be seen from comparison between the graphs 301 and 303, the signal reception strength in Comparative Example 1 is about 10 dB higher than the signal reception strength in Inventive Example 1 where 0°≤angle φ≤60° or 120°≤angle φ≤180°. As can be seen from comparison between the graphs 301 and 303, the signal reception strength in Comparative Example 1 is about 5 dB higher than the signal reception strength in Inventive Example 1 where 60°<angle φ<120°.

More specifically, it can be seen that the signal reception strength for the simulated manhole 200A removed of the iron cover 230A is higher than the signal reception strength for the simulated manhole 200A having the passive relay device 100 incorporated in the iron cover 230A.

As can be seen from comparison between graphs 302 and 303, the signal reception strength in Comparative Example 2 is about 10 dB lower than the signal reception strength in Inventive Example 1 where 0°≤angle φ≤180°.

More specifically, the signal reception strength for the simulated manhole 200A without the passive relay device 100 incorporated in the iron cover 230A is lower than the signal reception strength for the simulated manhole 200A with the passive relay device 100 incorporated in the iron cover 230A.

As can be seen from FIG. 6, the signal reception strength for the simulated manhole 200A with the iron cover 230A fitted thereto is lower than the signal reception strength for the simulated manhole 200A removed of the iron cover 230A. However, it can be seen that the signal reception strength can be improved by at least 10 dB by incorporating the passive relay device 100 into the iron cover 230A in the simulated manhole 200A.

Therefore, it can be considered that when the passive relay device 100 according to the embodiment is used for wireless communication between the internal device 1000 provided inside the radio wave shielding structure and the external device 2000 provided outside the radio wave shielding structure, radio wave attenuation can be reduced, and highly efficient long-distance wireless communication is allowed.

<Modifications>

In the above description of the embodiment, a manhole is used as a radio wave shielding structure byway of illustration. However, the radio wave shielding structure is not limited to the manhole and may, for example, be a handhole, a shield tunnel, and a sludge storage tank.

In the above description of the embodiment, the passive relay method includes the step of receiving data from the internal device 1000 and transmitting the data to the external antenna 20 through the connection part 30 by the internal antenna 10 and the step of receiving the data from the internal antenna 10 through the connection part 30 and transmitting the data to the external device 2000 by the external antenna 20 by way of illustration. However, the steps of the passive relay method are not limited to the above. The passive relay method may further include the step of receiving data from the external device 2000 and transmitting the data to the internal antenna 10 through the connection part 30 by the external antenna 20 and the step of receiving the data from the external antenna 20 through the connection part 30 and transmitting the data to the internal device 1000 by the internal antenna 10.

<Other Modifications>

The present invention is not limited by the above embodiments and modifications. For example, the various kinds of processing described above may be performed in parallel or individually according to the processing capability of the device used to perform the processing or as required as well as in time series as described above. Other modifications can be made as appropriate without departing from the scope and spirit of the present invention.

Although the embodiments have been described above as typical examples, many modifications and substitutions will be apparent to those skilled in the art within the scope and spirit of the present invention. Therefore, the present invention should not be construed as limited by the above-described embodiments, and various modifications and changes are possible without departing from the scope of the claims. For example, the order of steps described in the flowchart according to the embodiment is not limited to the above and can be changed as appropriate. Multiple steps can be combined into one or a single step may be divided into steps.

REFERENCE SIGNS LIST

10 Internal antenna
20 External antenna
30 Connection part
100 Passive relay device
200 Manhole (radio wave shielding structure)
210 Neck part
220 Case body
230 Iron cover

The invention claimed is:

1. A passive relay device which relays wireless communication between an inside of a radio wave shielding structure and an outside of the radio wave shielding structure, the inside of the radio wave shielding structure defining a first enclosure with an outer edge and a height measured perpendicular to the outer edge, and a second enclosure adjacent to the first enclosure, the passive relay device comprising:

an internal antenna which connects with the inside, the internal antenna including a directional antenna disposed in the first enclosure and directed toward the second enclosure located farther from the internal antenna than the first enclosure, the directional antenna having a directionality with respect to a radio wave reception angle that is adjustable based on a distance from the passive relay device to the outer edge of the first enclosure and the height of the first enclosure;
an external antenna which connects with the outside; and
a connection part which connects the internal antenna and the external antenna.

2. The passive relay device according to claim 1, wherein the radio wave shielding structure is a manhole buried underground,
the manhole has an iron cover provided with a through hole,
the connection part is provided at the through hole,
the internal antenna is provided in the vicinity of one end side of the through hole,
the external antenna is provided in the vicinity of the other end side of the through hole, and
the connection part has a length at least equal to the thickness of the iron cover.

3. The passive relay device according to claim 2, wherein the radio wave shielding structure is made of a material including metal and concrete or resin concrete.

4. The passive relay device according to claim 2, wherein the connection part is a coaxial cable or a waveguide.

5. The passive relay device according to claim 1, wherein the radio wave shielding structure is made of a material including metal and concrete or resin concrete.

6. The passive relay device according to claim 1, wherein the connection part is a coaxial cable or a waveguide.

7. The passive relay device according to claim 1, wherein the second enclosure has a greater volume than the first enclosure.

8. The passive relay device according to claim 1, wherein the radio wave reception angle ($\theta$) is calculated using an expression:

$$\theta = \cos^{-1}\frac{b^2 + c^2 - a^2}{2bc}$$
$$a = x_1 + x_2, b = \sqrt{x_1^2 + y^2}, c = \sqrt{x_2^2 + y^2},$$

wherein $x_1$ is a first distance from the passive relay device to the outer edge of the first enclosure, $x_2$ is a second distance from the passive relay device to the outer edge of the first enclosure located opposite from the first distance, and y is the height of the first enclosure.

9. The passive relay device according to claim 8, wherein the radio wave shielding structure is a manhole buried underground, and a sum of $x_1$ and $x_2$ equals a diameter of the manhole measured at ground level.

10. A passive relay method for relaying wireless communication between an internal device inside a radio wave shielding structure and an external device outside the radio wave shielding structure, the radio wave shielding structure defining therein a first enclosure with an outer edge and a height measured perpendicular to the outer edge, and a second enclosure adjacent to the first enclosure, the method comprising:
receiving data from the internal device located in the second enclosure;
transmitting the data to an external antenna through the connection part by an internal antenna, the internal antenna including a directional antenna disposed in the first enclosure and directed toward the second enclosure located farther from the internal antenna than the first enclosure, the directional antenna having a directionality with respect to a radio wave reception angle that is adjustable based on a distance from the passive relay device to the outer edge of the first enclosure and the height of the first enclosure, wherein the internal antenna transmits/receives radio waves to/from the internal device, the external antenna transmits and receives the radio waves to/from the external device, and the connection part connects the internal antenna and the external antenna;
receiving the data from the internal antenna through the connection part; and
transmitting the data to the external device by the external antenna.

11. The passive relay method according to claim 7, wherein
the radio wave shielding structure is a manhole buried underground,
the manhole has an iron cover provided with a through hole,
the connection part is provided at the through hole,
the internal antenna is provided in the vicinity of one end side of the through hole,
the external antenna is provided in the vicinity of the other end side of the through hole, and
the connection part has a length at least equal to the thickness of the iron cover.

12. The passive relay method according to claim 10, wherein the radio wave shielding structure is made of a material including metal and concrete or resin concrete.

13. The passive relay method according to claim 10, wherein the connection part is a coaxial cable or a waveguide.

14. The passive relay method according to claim 10, wherein the second enclosure has a greater volume than the first enclosure.

15. The passive relay method according to claim 10, wherein the radio wave reception angle ($\theta$) is calculated using an expression:

$$\theta = \cos^{-1}\frac{b^2 + c^2 - a^2}{2bc}$$
$$a = x_1 + x_2, b = \sqrt{x_1^2 + y^2}, c = \sqrt{x_2^2 + y^2},$$

wherein $x_1$ is a first distance from the passive relay device to the outer edge of the first enclosure, $x_2$ is a second distance from the passive relay device to the outer edge of the first enclosure located opposite from the first distance, and y is the height of the first enclosure.

16. The passive relay method according to claim 15, wherein the radio wave shielding structure is a manhole buried underground, and a sum of $x_1$ and $x_2$ equals a diameter of the manhole measured at ground level.

* * * * *